Sept. 1, 1953 — L. M. ROHM — 2,650,730
LIFTING TRAILER
Filed March 10, 1952 — 3 Sheets-Sheet 1
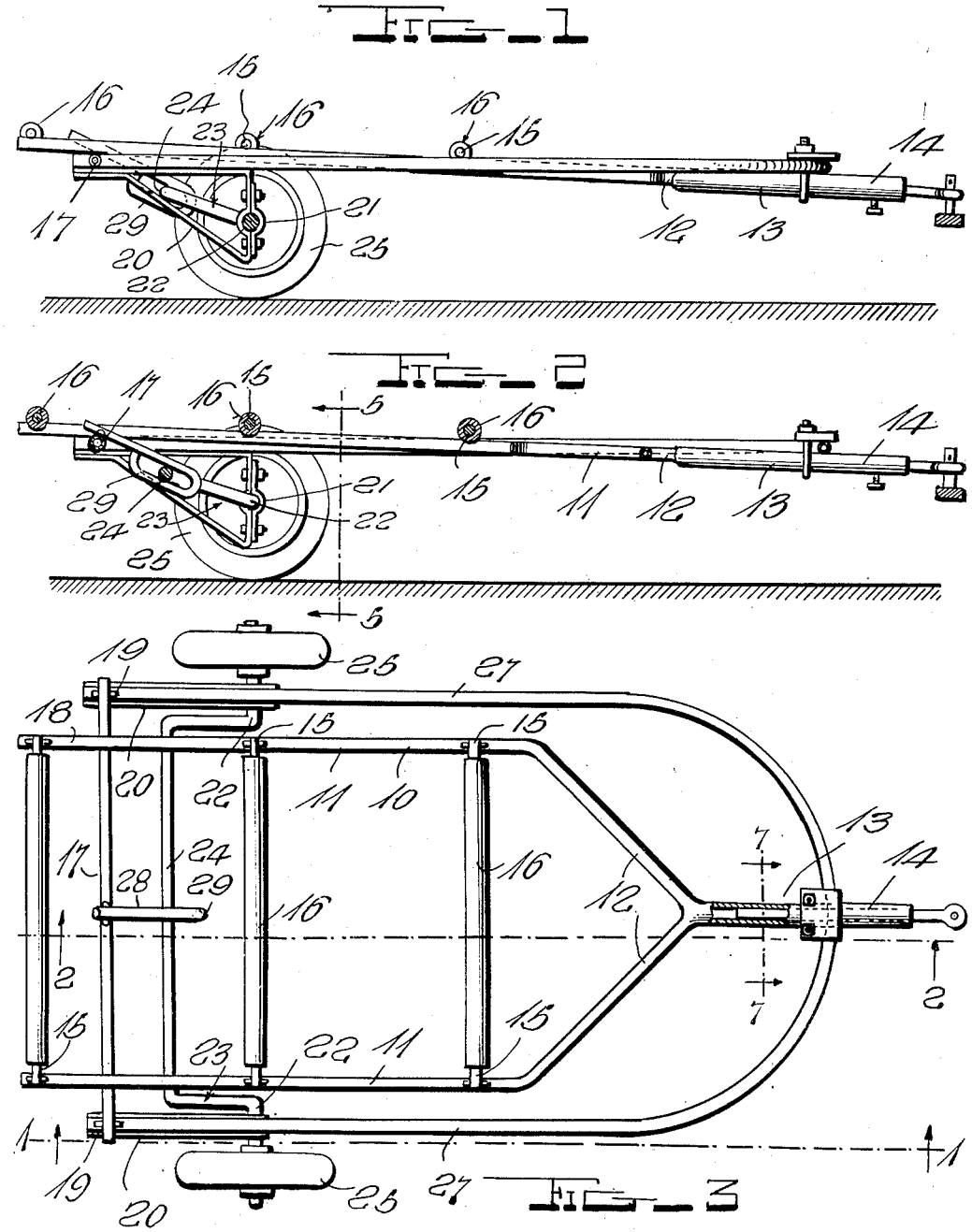
INVENTOR.
LEON M. ROHM,
BY Jacobi & Jacobi
ATTORNEYS Sept. 1, 1953 L. M. ROHM 2,650,730
LIFTING TRAILER
Filed March 10, 1952 3 Sheets-Sheet 2
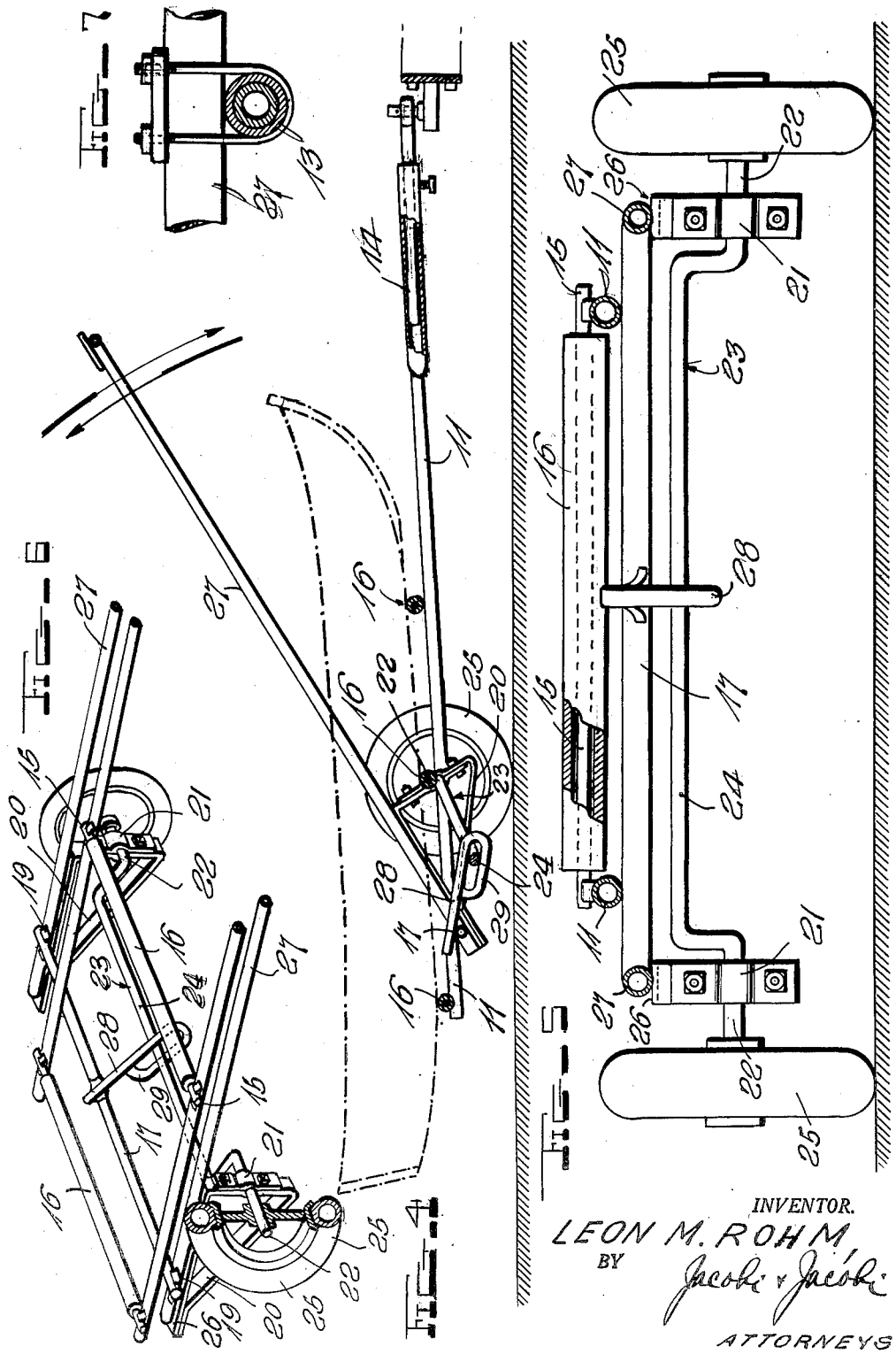
INVENTOR.
LEON M. ROHM
BY Jacobi & Jacobi
ATTORNEYS Sept. 1, 1953  L. M. ROHM  2,650,730
LIFTING TRAILER
Filed March 10, 1952  3 Sheets-Sheet 3
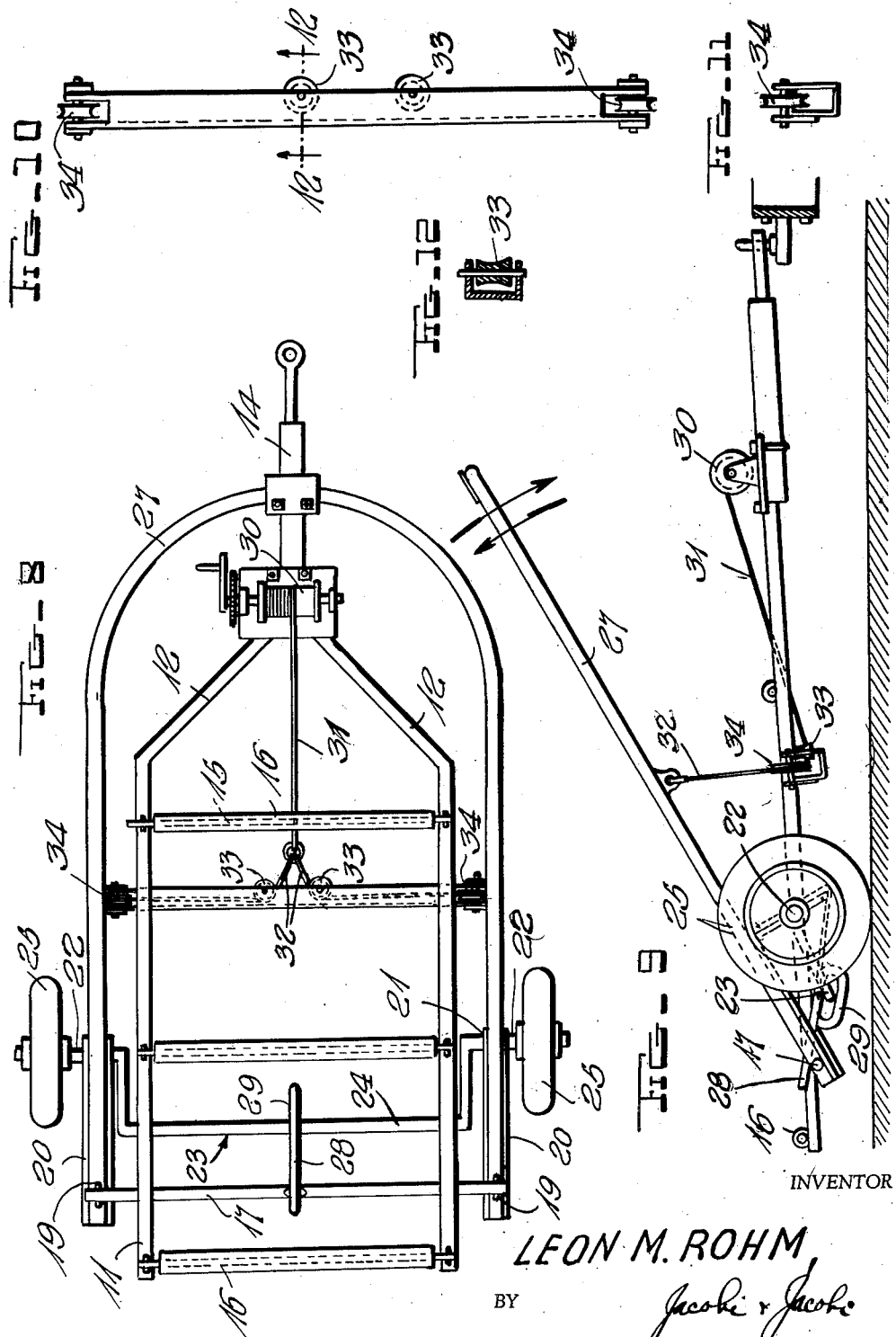
INVENTOR
LEON M. ROHM
BY Jacobi & Jacobi
ATTORNEYS Patented Sept. 1, 1953

2,650,730

UNITED STATES PATENT OFFICE 2,650,730

LIFTING TRAILER

Leon M. Rohm, Miami, Fla.

Application March 10, 1952, Serial No. 275,713

5 Claims. (Cl. 214—506)

1

This invention relates to vehicles for the carrying of bulky and relatively heavy loads and more particularly to those usable for transporting boats, tanks, and other cumbrous objects and which is adapted for coupling to a motor vehicle used for pulling it over land.

It is an object of this invention to provide a new and improved trailer for the transportation of substantial articles and loads that will have facilities for raising and lowering such articles during loading and unloading, in a very convenient and effective manner.

Another object of the invention is to provide a new and improved trailer for the carrying of heavy objects that will be simple in structure and economical to make, while at the same time, being arranged to distribute the load carried evenly on its supporting wheels.

Other objects will become apparent as the invention is more fully set forth.

For a clearer understanding of the invention and its objects, reference is made to the accompanying drawings, wherein a particular form of the invention is indicated by way of example. These drawings in conjunction with the following description illustrate the invention and show how it is used practically, while the claims emphasize the scope thereof.

In the drawings:

Figure 1 is a side elevation of a lifting trailer embodying this invention; the view being taken partly in section on line 1—1 of Figure 3.

Figure 2 is a sectional elevation on line 2—2 of Figure 3.

Figure 3 is a plan view, with portions broken away to show their structure.

Figure 4 is a longitudinal elevation similar to Figure 2, but showing the frame in a lowered position in which a boat may be moved onto or off of the trailer.

Figure 5 is a transverse sectional elevation taken on line 5—5 of Figure 2.

Figure 6 is a fragmentary perspective detail of the trailer structure at the axle and wheels.

Figure 7 is a detail section taken on line 7—7 of Figure 3.

Figure 8 is a plan view of the trailer, including a modified form of elevating mechanism.

Figure 9 is a side elevation.

Figure 10 is a plan view of frame channel with mounted sheaves for winch cable.

Figs. 11 and 12 are views of details with Fig. 12 being a section taken on the line 12—12 of Fig. 10.

Similar parts are designated by the same reference numbers throughout the drawings.

2

Referring to Figures 1, 2, and 3, in which a lifting trailer of a particular form is illustrated. The trailer comprises a supporting frame 10. This frame 10, has a pair of parallel struts or side bars 11, running longitudinally and joined together at the front 12 by being bent at an angle towards the middle or axis of the frame. They meet at an apex and connect with a tubular draw bar 13, which is open at its front end for reception of a coupling 14 adapted for attachment to a pulling vehicle. Crossbars 15 are located transversely across the frame 10, and fastened at spaced intervals thereto. Rollers 16 formed of pipe rotate on these crossbars and facilitate the placement of boats and other equipment loaded on the frame. Normally the frame is horizontally positioned as shown in Figures 1 and 2. An extended rear crossbar 17, rigidly joins the struts 11 together, and at a location that enables the end portions 18 of the struts to project a short distance beyond it. The portions 18 and the rear roller are used to facilitate the placement of the load on the frame, and for its removal at the delivery point.

The end portions of the cross bar 17 are rotatably supported by bearings 19. These bearings 19 are carried by rear end portions of side bars of a lever 27 and disposed over rear ends of triangular brackets or plates 20. The front end of each plate 20 supports a bearing 21, which in turn journal the ends 22 of an eccentric axle 23. The axle 23 is of U-contour with its middle member 24 eccentrically disposed rearwardly of the frame. The ends 22 are used as spindles to support the wheels 25 on which the trailer travels. The upper side 26 of each plate 20, serves as a base on which a manipulating bar or lever 27 rests parallel on it. The lever 27, is of U-form and is made long enough to provide the leverage desirable for lifting the loaded articles on and off the frame 10. A link member 28 is rigidly attached to the rear cross-bar 17, at the middle of the frame, and extends forwardly to the axle member 24, and loosely couples around it by means of a loop or eye 29.

The purpose of this last mentioned connection will be explained in the operation of the device.

In the operation of the device, the manipulating bar or lever 27 is raised towards the vertical shown in Figure 4. This tilts the plates 20 angularly back and brings the rear cross-bar 17 close to the ground, while the ends 18, make contact with the ground. The link member 28 pulls on the eccentric portion 24 of the axle 23, and causes the axle to rotate backwardly. As the axle tilts rearwardly and downwardly the frame 10 is also tilted downwardly from the position shown in Figure 1 to that of Figure 4 and the frame is disposed at an incline that tends to facilitate loading and unloading by sliding of the load longitudinally upon the rollers onto or off of the frame. After the frame is loaded the manipulating bar 27 is lowered and this swings the rear end of the frame upwardly and causes the member 28 to raise the eccentric portion of the axle and incidentally raise the load off the ground, and place it in a horizontal plane, with the manipulating bar 27 parallel to the frame 10. The trailer is then ready to travel.

In Figure 8, the raising of the axle member 24 is facilitated by the use of a winch 30 installed on the bar 13 and by means of its wire rope 31 and its branches 32 which extend from the rope about guide pulleys 33 and 34 and are connected to the manipulating bar 27 at opposide sides thereof. The winding of the winch pulls on the wire rope 31, which in turn pulls on manipulating bar 27 and rotates the axle to its upper position.

The device is simple comparatively and light in construction and, therefore, is desirable for trailer purposes. It is readily manipulated by the user, and can be used for heavy and cumbersome loads.

While the forms of the invention indicated are simple, it is not desired to limit this application for Letters Patent to such as it is appreciated that other forms could be designed and made that would embody the same principles and come within the scope of the appended claims.

Having thus described the invention what is claimed is:

1. A lifting trailer comprising in combination a loading frame including a pair of struts with cross-bars transversely disposed thereon, one of said cross-bars having ends extended transversely beyond the struts with bearings thereon, a pair of plates of geometrical form each arranged to hold one of said bearings at its rear end, an axle bearing at the front end of each of the plates, an eccentric axle with its end portions journalled in said last mentioned bearings and adapted for movement of the eccentric portion of the axle from an approximate horizontal plane downwardly towards a vertical plane, a manipulating bar resting on and attached to the rear portion of said plates and adapted to tilt with the plates on said axle bearings from a horizontal plane to an angular one above the frame, and thereby lowering said frame with a load thereon to a position close to the ground from one above the journal portions of said axle in which it extends rearwardly at a downward incline, wheels on said journal portions for carrying the axle, and means for coupling the frame to a pulling vehicle, and a link member connecting the extended cross-bar to the eccentric portion of the axle for facilitating the raising and lowering movements of the frame by said manipulating bar.

2. A lifting trailer comprising in combination a loading frame including a pair of struts with cross-bars transversely disposed thereon, one of said cross-bars being disposed between rear end portions of the struts with bearings thereon, a pair of plates each arranged to hold one of said bearings at its rear end, an axle bearing at the front end of each of the plates, an eccentric axle with its end portions journalled in said last mentioned bearings and adapted for rotation of the eccentric portion of the axle from an approximate horizontal plane towards a vertical plane, a manipulating bar resting on and attached to said plates and adapted to rotate on said axle bearings from a horizontal plane to an angular one above the frame, and thereby lowering said frame with a load thereon to a position close to the ground from one above the journal portions of said axle in which the manipulating bar extends rearwardly at a downward incline, wheels on said journal portions for carrying the axle, means for coupling the frame to a pulling vehicle, and a link member connecting the extended crossbar to the eccentric portion of the axle for facilitating the raising and lowering movements of the frame by said manipulating bar the form of each said plate being triangular in a rearwardly tapered vertical plane with the manipulating bar on the side most uppermost.

3. A lifting trailer comprising in combination a loading frame including a pair of struts with cross-bars transversely disposed thereon, one of said cross-bars having end portions extended transversely beyond the struts with bearings thereon, a pair of plates of geometrical form each arranged to hold one of said bearings at its rear end, an axle bearing at the front end of each of the plates, an eccentric axle having its end portions journalled in said last mentioned bearings and adapted for rotation of the eccentric member from an approximate horizontal plane to a position in which it extends rearwardly at a downward incline, a manipulating bar resting on and attached to a side of said plates and adapted to rotate from a horizontal plane to an angular one above the frame, and thereby lowering said frame with a load thereon to a position close to the ground from one above the journal portions of said axle, wheels on said journal portions for carrying the axle, and means for coupling the frame to a pulling vehicle, a link member connecting the extended cross-bar, to the eccentric member for facilitating the raising and lowering movements of the frame by said manipulating bar, the form of each said plate being a rearwardly tapered triangle triangular in a vertical plane with the manipulating bar on the side most uppermost, the struts of the frame being brought together to an apex at the front end thereof and extended into a single bar running in a direction parallel to the frame and to the front of the trailer, said bar being attached thereto to connect the vehicle and trailer together.

4. A lifting trailer comprising in combination a loading frame including a pair of struts with cross-bars transversely disposed thereon, end portions of one of said cross-bars being extended transversely beyond the struts with bearings thereon, a pair of plates each arranged to hold one of said bearings at the rear end, an axle bearing at the front end of each of the plates, an eccentric axle having its end portions journalled in said last mentioned bearings and adapted for rotation of the eccentric portion of the axle from an approximate horizontal plane towards a vertical plane, a manipulating bar resting on and attached to a side of said plate and adapted to rotate on said axle bearings from a horizontal plane to an angular one above the frame in which it extends rearwardly at a downward incline, and thereby lowering said frame with a load thereon to a position close to the ground from one above the journal portions of said axle, wheels on said journal portions of the axle for carrying the axle, means for coupling the frame to a pulling vehicle, and a link member connecting the extended cross-bar to the eccentric portion of the axle for facilitating the raising and lowering movements of the frame by said manipulating bar, the form of each said plate being triangular in a vertical plane with the manipulating bar on the side most uppermost, the struts of the frame being brought together to an apex at its front end and extended into a single bar, running in a direction parallel to the frame and to the front of the trailer, said means being attached thereto to connect the vehicle and trailer together, and said axle including its eccentric portion being located under the frame so as to support the latter when loaded.

5. A lifting trailer comprising in combination a loading frame including a pair of struts with cross-bars transversely disposed thereon, one of said cross-bars having end portions extended transversely beyond the struts with bearings thereon, a pair of plates each arranged to hold one of said bearings at its rear end, an axle bearing at the front end of each of the plates, an eccentric axle with its end portions journalled in said last mentioned bearings and adapted for rotation of the eccentric portion of the axle from an approximate horizontal plane towards a vertical plane, a manipulating bar resting on and attached to a side of each plate and adapted to rotate on said axle bearings with the plates from a horizontal plane to an angular one above the frame, and thereby lowering said frame with a load thereon to a position close to the ground from one above the journal portions of said axle, wheels on said journal portions for carrying the axle, means for coupling the frame to a pulling vehicle, and a link member connecting the extended cross-bar to the eccentric portion of the axle for facilitating the raising and lowering movements of the frame by said manipulating bar, the form of each said plate being triangular in a vertical plane with the manipulating bar on the side most uppermost, the struts of the frame being brought together to an apex at its front end and extended forwardly into a single bar, running in a direction parallel to the frame and to the front of the trailer, said bar being attached thereto to connect the vehicle and trailer together, said axle including its eccentric portion being located under the frame so as to support the latter when loaded, and winch means mounted on said frame and attached to the manipulating bar, including a wire rope cable windable thereon and arranged to pull around sheaves on said frame.

LEON M. ROHM.

References Cited in the file of this patent

UNITED STATES PATENTS

| Number | Name | Date |
|---|---|---|
| 2,487,701 | Getz | Nov. 8, 1949 |
| 2,610,865 | Cantrell | Sept. 16, 1952 |